US009083798B2

(12) United States Patent
Cross et al.

(10) Patent No.: US 9,083,798 B2
(45) Date of Patent: Jul. 14, 2015

(54) ENABLING VOICE SELECTION OF USER PREFERENCES

(75) Inventors: Charles W. Cross, Wellington, FL (US); Yan Li, Miami, FL (US)

(73) Assignee: Nuance Communications, Inc., Burlington, MA (US)

(*) Notice: Subject to any disclaimer, the term of this patent is extended or adjusted under 35 U.S.C. 154(b) by 1517 days.

(21) Appl. No.: 11/022,464

(22) Filed: Dec. 22, 2004

(65) Prior Publication Data

US 2006/0136222 A1 Jun. 22, 2006

(51) Int. Cl.
*G10L 15/00* (2013.01)
*G10L 21/00* (2013.01)
*H04M 3/493* (2006.01)
*G10L 15/26* (2006.01)
*G10L 15/19* (2013.01)

(52) U.S. Cl.
CPC .............. *H04M 3/4938* (2013.01); *G10L 15/26* (2013.01); *G10L 15/19* (2013.01); *H04M 2201/40* (2013.01)

(58) Field of Classification Search
CPC ................... H04M 1/72561; H04M 2203/251; G10L 25/48; G10L 2015/221; G10L 15/265; G10L 15/065; G10L 15/22; G10L 17/005; G06F 3/167
USPC .................................................. 704/246, 270
See application file for complete search history.

(56) References Cited

U.S. PATENT DOCUMENTS 5,577,165 A 11/1996 Takebayashi et al.
5,584,052 A 12/1996 Galau et al.
5,742,926 A * 4/1998 Yumura et al. ................... 704/2

(Continued)

FOREIGN PATENT DOCUMENTS

CN 1385783 A 12/2002
CN 1564123 A 1/2005

(Continued)

OTHER PUBLICATIONS

Christian, K., Kules, B., Shneiderman, B., and Youssef, A. 2000. A comparison of voice controlled and mouse controlled web browsing. In Proceedings of the Fourth international ACM Conference on Assistive Technologies (Arlington, Virginia, United States, Nov. 13-15, 2000). Assets '00. ACM, New York, NY, 72-79.*

(Continued)

*Primary Examiner* — Richemond Dorvil
*Assistant Examiner* — Michael Ortiz Sanchez
(74) *Attorney, Agent, or Firm* — Wolf, Greenfield & Sacks, P.C.

(57) ABSTRACT

A method, system and apparatus for voice enabling a user preference interface in a multimodal content browser. A method for voice enabling a user preference interface in a multimodal content browser can include matching voice input to a bound command in a speech grammar and invoking logic in the user preference interface consistent with the bound command in the speech grammar. The matching step can include comparing voice input to entries in a markup language specified speech grammar and locating the bound command in the specified speech grammar based upon the comparison. In this regard, the method further can include identifying a variable in the bound command, looking up the variable in a table, retrieving a corresponding parameter for the variable from the table, and replacing the variable with the corresponding parameter in the bound command.

20 Claims, 3 Drawing Sheets

(56) References Cited

U.S. PATENT DOCUMENTS

| | | | |
|---|---|---|---|
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,314,402 B1* | 11/2001 | Monaco et al. | 704/275 |
| 6,490,564 B1 | 12/2002 | Dodrill et al. | |
| 6,513,011 B1 | 1/2003 | Uwakubo | |
| 6,578,000 B1 | 6/2003 | Dodrill et al. | |
| 6,606,599 B2 | 8/2003 | Grant et al. | |
| 6,738,803 B1 | 5/2004 | Dodrill et al. | |
| 6,856,960 B1 | 2/2005 | Dragosh et al. | |
| 6,882,974 B2* | 4/2005 | James et al. | 704/270.1 |
| 6,920,425 B1 | 7/2005 | Will et al. | |
| 6,999,930 B1 | 2/2006 | Roberts et al. | |
| 7,020,841 B2* | 3/2006 | Dantzig et al. | 715/727 |
| 7,035,805 B1 | 4/2006 | Miller | |
| 7,054,818 B2* | 5/2006 | Sharma et al. | 704/270 |
| 7,171,243 B2 | 1/2007 | Watanabe et al. | |
| 7,188,067 B2 | 3/2007 | Grant et al. | |
| 7,191,135 B2* | 3/2007 | O'Hagan | 704/270.1 |
| 7,246,063 B2* | 7/2007 | James et al. | 704/270.1 |
| 7,260,535 B2* | 8/2007 | Galanes et al. | 704/270 |
| 7,299,187 B2* | 11/2007 | Tahara et al. | 704/275 |
| 7,324,942 B1* | 1/2008 | Mahowald et al. | 704/270 |
| 7,330,890 B1 | 2/2008 | Partovi et al. | |
| 7,376,586 B1 | 5/2008 | Partovi et al. | |
| 7,487,081 B2* | 2/2009 | Shimomura et al. | 704/4 |
| 7,487,085 B2 | 2/2009 | Ativanichayaphong et al. | |
| 7,487,440 B2* | 2/2009 | Gergic et al. | 715/234 |
| 7,509,659 B2 | 3/2009 | McArdle | |
| 7,555,431 B2 | 6/2009 | Bennett | |
| 7,624,007 B2 | 11/2009 | Bennett | |
| 7,831,429 B2* | 11/2010 | O'Hagan | 704/270 |
| 2002/0002458 A1* | 1/2002 | Owen et al. | 704/260 |
| 2002/0059066 A1* | 5/2002 | O'Hagan | 704/231 |
| 2002/0062216 A1 | 5/2002 | Guenther et al. | |
| 2002/0065944 A1 | 5/2002 | Hickey et al. | |
| 2002/0072914 A1* | 6/2002 | Alshawi et al. | 704/270.1 |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0152275 A1 | 10/2002 | Bettis | |
| 2002/0169611 A1 | 11/2002 | Guerra et al. | |
| 2002/0184610 A1 | 12/2002 | Chong et al. | |
| 2002/0198719 A1* | 12/2002 | Gergic et al. | 704/270.1 |
| 2003/0009335 A1* | 1/2003 | Schalkwyk et al. | 704/257 |
| 2003/0018700 A1* | 1/2003 | Giroti et al. | 709/201 |
| 2003/0021394 A1* | 1/2003 | Krack | 379/88.01 |
| 2003/0039341 A1 | 2/2003 | Burg et al. | |
| 2003/0046316 A1 | 3/2003 | Geric et al. | |
| 2003/0046346 A1 | 3/2003 | Mumick et al. | |
| 2003/0071833 A1* | 4/2003 | Dantzig et al. | 345/700 |
| 2003/0101451 A1 | 5/2003 | Bentolila et al. | |
| 2003/0125945 A1 | 7/2003 | Doyle | |
| 2003/0133545 A1* | 7/2003 | Rosset | 379/93.01 |
| 2003/0154077 A1* | 8/2003 | Tahara et al. | 704/239 |
| 2003/0158736 A1 | 8/2003 | James et al. | |
| 2003/0179865 A1 | 9/2003 | Stillman et al. | |
| 2003/0182622 A1* | 9/2003 | Sibal et al. | 715/511 |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0008167 A1 | 1/2004 | Shigeno | |
| 2004/0019487 A1 | 1/2004 | Kleindienst et al. | |
| 2004/0025115 A1 | 2/2004 | Seinel et al. | |
| 2004/0027379 A1* | 2/2004 | Hong Huey et al. | 345/764 |
| 2004/0030993 A1* | 2/2004 | Hong Huey et al. | 715/513 |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0078201 A1* | 4/2004 | Porter et al. | 704/275 |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0172254 A1* | 9/2004 | Sharma et al. | 704/270.1 |
| 2004/0179038 A1 | 9/2004 | Blattner et al. | |
| 2004/0216036 A1 | 10/2004 | Chu et al. | |
| 2004/0230637 A1* | 11/2004 | Lecoueche et al. | 709/200 |
| 2004/0236574 A1 | 11/2004 | Ativanichayaphong et al. | |
| 2004/0260562 A1 | 12/2004 | Kujirai | |
| 2005/0075884 A1 | 4/2005 | Badt, Jr. | |
| 2005/0080628 A1* | 4/2005 | Kuperstein | 704/270.1 |
| 2005/0091059 A1 | 4/2005 | Lecoeuche | |
| 2005/0131701 A1 | 6/2005 | Cross et al. | |
| 2005/0138219 A1 | 6/2005 | Bou-Ghannam et al. | |
| 2005/0138647 A1 | 6/2005 | Bou-Ghannam et al. | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross et al. | |
| 2005/0273769 A1 | 12/2005 | Eichenberger et al. | |
| 2005/0283367 A1 | 12/2005 | Ativanichayaphong et al. | |
| 2006/0025997 A1* | 2/2006 | Law et al. | 704/257 |
| 2006/0047510 A1 | 3/2006 | Ativanichayaphong et al. | |
| 2006/0064302 A1 | 3/2006 | Ativanichayaphong et al. | |
| 2006/0069564 A1 | 3/2006 | Allison et al. | |
| 2006/0074671 A1* | 4/2006 | Farmaner et al. | 704/257 |
| 2006/0074680 A1 | 4/2006 | Cross et al. | |
| 2006/0075120 A1 | 4/2006 | Smit | |
| 2006/0111906 A1 | 5/2006 | Cross et al. | |
| 2006/0122836 A1 | 6/2006 | Cross et al. | |
| 2006/0123358 A1 | 6/2006 | Lee et al. | |
| 2006/0136222 A1 | 6/2006 | Cross et al. | |
| 2006/0143015 A1 | 6/2006 | Knott et al. | |
| 2006/0146728 A1 | 7/2006 | Engelsma et al. | |
| 2006/0150082 A1 | 7/2006 | Raiyani et al. | |
| 2006/0168095 A1 | 7/2006 | Sharma et al. | |
| 2006/0168595 A1 | 7/2006 | McArdle | |
| 2006/0184626 A1 | 8/2006 | Agapi et al. | |
| 2006/0190264 A1 | 8/2006 | Jaramillo | |
| 2006/0218039 A1 | 9/2006 | Johnson | |
| 2006/0229880 A1 | 10/2006 | White et al. | |
| 2006/0235694 A1 | 10/2006 | Cross et al. | |
| 2006/0287845 A1 | 12/2006 | Cross, Jr. et al. | |
| 2006/0287865 A1 | 12/2006 | Cross, Jr. et al. | |
| 2006/0287866 A1 | 12/2006 | Cross, Jr. et al. | |
| 2006/0288309 A1 | 12/2006 | Cross, Jr. et al. | |
| 2007/0265851 A1 | 11/2007 | Ben-David et al. | |
| 2007/0274296 A1 | 11/2007 | Cross, Jr. et al. | |
| 2007/0274297 A1 | 11/2007 | Cross, Jr. et al. | |
| 2007/0288241 A1 | 12/2007 | Cross et al. | |
| 2007/0294084 A1 | 12/2007 | Cross et al. | |
| 2008/0065386 A1 | 3/2008 | Cross et al. | |
| 2008/0065387 A1 | 3/2008 | Cross, Jr. et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Ativanichayaphong et al. | |
| 2008/0162136 A1 | 7/2008 | Agapi et al. | |
| 2008/0177530 A1 | 7/2008 | Cross et al. | |
| 2008/0195393 A1 | 8/2008 | Cross et al. | |
| 2008/0208584 A1 | 8/2008 | Ativanichayaphong et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Ben-David et al. | |
| 2008/0208588 A1 | 8/2008 | Ativanichayaphong et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross | |
| 2008/0228495 A1 | 9/2008 | Cross, Jr. et al. | |
| 2008/0235021 A1 | 9/2008 | Cross et al. | |

(56) References Cited

U.S. PATENT DOCUMENTS

| | | |
|---|---|---|
| 2008/0235022 A1 | 9/2008 | Bergl et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Ativanichayaphong et al. |

FOREIGN PATENT DOCUMENTS

| | | |
|---|---|---|
| EP | 0794670 A | 9/1997 |
| EP | 1450350 | 8/2004 |
| GB | 0507148.5 | 4/2005 |
| JP | 2000/155529 A | 6/2000 |
| JP | 2003/140672 A | 5/2003 |
| WO | WO 9948088 | 9/1999 |
| WO | WO 0051106 A | 8/2000 |
| WO | WO 02/32140 A | 4/2002 |
| WO | WO 2004/062945 A | 7/2004 |
| WO | WO 2006/108795 | 10/2006 |

OTHER PUBLICATIONS

James, F. and Roelands, J. 2002. Voice over Workplace (VoWP): voice navigation in a complex business GUI. In Proceedings of the Fifth international ACM Conference on Assistive Technologies (Edinburgh, Scotland, Jul. 8-10, 2002). Assets '02. ACM, New York, NY, 197-204.*
U.S. Appl. No. 10/441,839, filed May 20, 2003, S. Ativanichayaphong.
U.S. Appl. No. 10/733,610, filed Dec. 11, 2003, C. Cross, Jr.
U.S. Appl. No. 10/741,499, filed Dec. 19, 2003, A. Bou-Ghannam.
U.S. Appl. No. 10/741,997, filed Dec. 19, 2003, A. Bou-Ghannam.
U.S. Appl. No. 10/849,642, filed May 19, 2004, C. Cross, Jr.
U.S. Appl. No. 10/870,517, filed Jun. 17, 2004, S. Ativanichayaphong et al.
U.S. Appl. No. 10/919,005, filed Aug. 2004, A. Eichenberger et al.
U.S. Appl. No. 10/924,520, filed Aug. 24, 2004, S. Ativanichayaphong et al.
U.S. Appl. No. 10/945,112, filed Sep. 20, 2004, S. Ativanichayaphong et al.
U.S. Appl. No. 10/945,119, filed Sep. 20, 2004, C. Cross, Jr.
U.S. Appl. No. 10/992,979, filed Nov. 19, 2004, C. Cross, Jr.
U.S. Appl. No. 11/007,830, filed Dec. 8, 2004, C. Cross, Jr.
U.S. Appl. No. 11/022,464, filed Dec. 22, 2004, C. Cross, Jr.
U.S. Appl. No. 11/056,493, filed Feb. 11, 2005, C. Agapi.
U.S. Appl. No. 11/062,731, filed Feb. 22, 2005, D. Jaramillo.
U.S. Appl. No. 11/093,545, filed Mar. 30, 2005, M. White.
U.S. Appl. No. 11/105,865, filed Apr. 14, 2005, C. Cross, Jr.
U.S. Appl. No. 12/109,151, filed Apr. 24, 2008, C.Agapi et al.
U.S. Appl. No. 12/109,167, filed Apr. 24, 2008, C. Agapi et al.
U.S. Appl. No. 12/109,204, filed Apr. 24, 2008, C. Agapi et al.
U.S. Appl. No. 12/109,214, filed Apr. 24, 2008, C. Agapi et al.
U.S. Appl. No. 12/109,227, filed Apr. 24, 2008, C. Agapi et al.
Axelsson et al.; "XHTML+Voice Profile 1.2" Internet, [Online] Mar. 16, 2004 (Mar. 6, 2004), pp. 1-53, XP002484188 Retrieved from the Internet URL: http://www.voicexml.org/specs/multimodal/x+v/12spec.html [retrieved on Jun. 12, 2008].
Didier Guillevic et al., Robust Semantic Confidence Scoring ICSLP 2002:7th International Conference on Spoken Language Processing. Denver, CO, Sep. 16-20, 2002 International Conference on Spoken Language Processing (ICSLP), Adelaide: Causal Productions, A1, Sep. 16, 2002, p. 853, XP007011561 ISBN:9788-1-876346-40-9.
W3C: "Voice Extensible Markup Langage (VoiceSML) Version 2.0" Internet Citation, [Online] XP002248286 Retrieved from the Internet: URL:http://www.w3.org/TR/voicexm120 [retrieved on Jul. 18, 2003].
W3C: "Voice Extensible Markup Language (VoiceXML) 2.1, W3C Candidate Recommendation Jun. 13, 2005" INTERNET, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].
PCT Search Report, Jun. 25, 2008; PCT Application No. PCT/EP2008/051358.
PCT Search Report, Jun. 18, 2008; PTC Application No. PCT/EP2008/051363.

* cited by examiner

ENABLING VOICE SELECTION OF USER PREFERENCES

BACKGROUND OF THE INVENTION

1. Statement of the Technical Field

The present invention relates to a user interface and more particularly to voice enabling a multimodal markup language defined user interface.

2. Description of the Related Art

The user interface of a computer program serves the function of receiving input from an end user for underlying program logic, and for providing output produced by the program logic. Initially a mere command prompt, the conventional user interface has evolved over time into the complex, graphical user interface familiar to most computing end users today. More recently, the graphical user interface has been rendered both portable and dynamic through the utilization of markup language and server page technologies, including the extensible hypertext markup language (XHTML).

Notwithstanding the tremendous advances in the visual user interface, the visual aspect can be appropriate in many circumstances. For instance, some applications are deployed in environments not conducive to the use of a keyboard and monitor. Examples include telephonic applications including interactive voice response systems and hands-free applications such as those deployed in an automobile, to name only a few. To accommodate these non-traditional environments, extensive use has been made of the audible user interface. In fact, whole technologies, including the voice extensible markup language (VoiceXML) have been developed to address this unique market segment.

Not all applications operate in an environment dominated by a particular modality of interaction. In fact, in some multimodal environments, often both audio and visual interface cues can be appropriate. Previously, multimodal environments required a separately specified user interface for each modality of interaction, including for instance an audio user interface and a graphical user interface. To generate a separate user interface for each specified modality of interaction, however, can be costly in terms of development time, expertise and maintenance.

Multimodal applications are computing applications which provide multiple interface types to accommodate the needs of prospective end users. Importantly, multimodal applications do not require separate user interfaces to accommodate each separate modality of interaction. Rather, the content of a multimodal application can specify the presentations and interactions in both visual and voice modalities. In most cases, the end user can choose a desired, most efficient input method for interacting with the underlying logic of the application.

Notably, the XHTML+Voice (X+V) markup language represents one technical effort to produce a multimodal application development environment. In X+V, XHTML and VoiceXML can be mixed in a single document. The XHTML portion of the document can manage visual interactions with an end user, while the VoiceXML portion of the document can manage voice interactions with the end user. The Multimodal Toolkit for WebSphere® Studio manufactured by IBM Corporation of Armonk, N.Y., United States incorporates X+V support in developing multimodal applications. In X+V, command, control and content navigation (C3N) can be enabled while simultaneously rendering multimodal content. The X+V profile specifies how to compute grammars based upon the visual hyperlinks present in a page.

SUMMARY OF THE INVENTION

The present invention addresses the deficiencies of the art in respect to multimodal page processing and provides a novel and non-obvious method, system and apparatus for voice enabling a user preference interface in a multimodal content browser. A method for voice enabling a user preference interface in a multimodal content browser can include matching voice input to a bound command in a speech grammar and invoking logic in the user preference interface consistent with the bound command in the speech grammar. The matching step can include comparing voice input to entries in a markup language specified speech grammar and locating the bound command in the specified speech grammar based upon the comparison. In this regard, the method further can include identifying a variable in the bound command, looking up the variable in a table, retrieving a corresponding parameter for the variable from the table, and replacing the variable with the corresponding parameter in the bound command.

The invoking step can include formulating an event utilizing the bound command and posting the event to an event handler in the user preference interface. For instance, in one aspect of the invention, the invoking step can include the step of invoking logic programmed to bring a specified grouping of elements in the user preference interface into focus. Yet, in another aspect of the invention, the invoking step can include the step of invoking logic programmed to set a preference in a specified grouping of elements in the user preference interface into focus. Finally, in yet another aspect of the invention, the invoking step can include first invoking logic programmed to bring a specified grouping of elements in the user preference interface into focus, and second invoking logic programmed to set a preference in the specified grouping.

A system for voice enabling a user preference interface in a multimodal content browser can include a speech grammar having one or more voice command entries. For instance, the speech grammar can be a VoiceXML compliant grammar having a link enabled for C3N. Each entry can have a voice command bound to a corresponding navigation command. The system further can include voice logic configured to match received voice input with one of the voice command entries in the speech grammar in order to invoke logic in the user preference interface consistent with a bound navigation command in the speech grammar. The system additionally can include a table of command variables and corresponding command parameters. In this case, the voice logic can include an additional configuration for substituting a variable in a voice command entry with a corresponding command parameter in the table.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for voice enabling a user preference interface to a multimodal browser. In accordance with the present invention, a command and control grammar can be enabled for processing in conjunction with the navigation of a user preference interface to a multimodal content browser. The command and control fragment can recognize and process voice commands for showing portions of the user preference interface and for setting preferences in the user preference interface. The grammar further can include the settings available for selection when setting preferences in the user preference interface.

Importantly, through the operation of the present invention, the user preference interface can be voice navigated and manipulated without requiring a navigation of the entire user interface to the multimodal browser. Rather, the user preferences interface can be invoked directly so as to be particularly useful in a hands-free environment and also for the benefit of the visually impaired. As an additional advantage, the grammar can be defined in a markup language document and can bind speech recognition events to particular functions. Accordingly, as such the user preference interface behavior can be specified through a markup language document, the binding of events to functions can be dynamic in nature and can be established at runtime.

Figure 1:
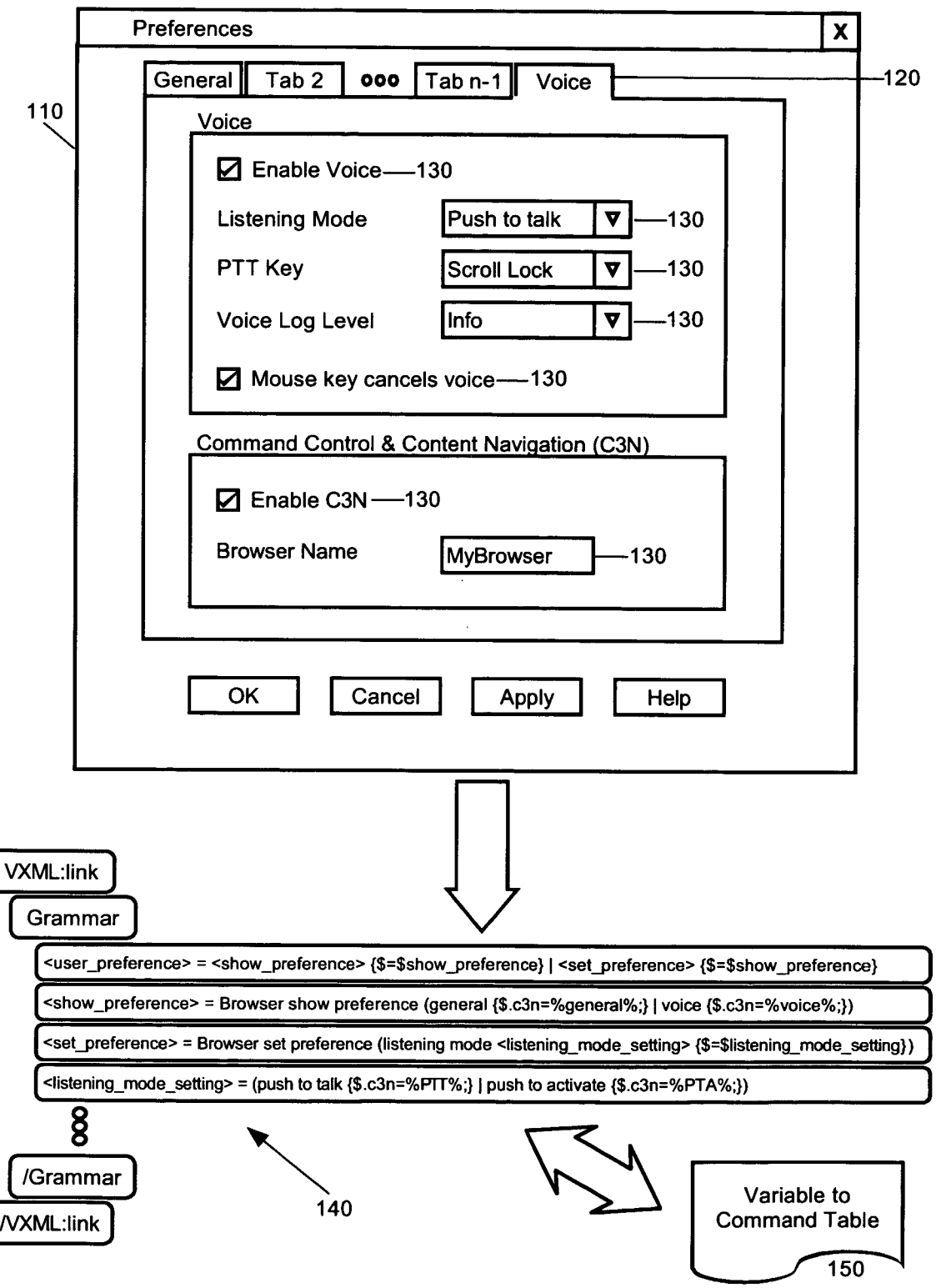
FIG. 1 is a pictorial illustration of a user preference interface to a multimodal browser configured for voice navigation.

In further illustration, FIG. 1 is a pictorial illustration of a user preference interface to a multimodal browser configured for voice navigation. A multimodal content browser can display markup language defined content which can include one or more user interface elements along with textual, visual and audible content. The user interface elements can be activated through a keyboard or pointing device. Also, the selection of the user interface elements can accommodate a different modality of interaction such as voice selection.

As shown in FIG. 1, a user preference interface 110 to a multimodal content browser can include one or more specific sections 120 which can be accessed by selecting a tab associated with a coupled one of the sections 120. The sections, by way of example, each can include grouped user preferences in respect to the operation of the multimodal content browser. To that end, the sections 120 of the user preference interface 110 can include one or more user interface elements 130 including checkboxes, drop down boxes and text fields, to name only a few. The preference settings defined in the user interface elements 130 of the sections 120 can specify the user preferences for the multimodal content browser.

Importantly, a voice grammar 140 can bind voice commands to logic programmed to both set and show preferences in the sections 120 of the user preference interface 110. In particular, the voice grammar 140 can bind variable placeholders in the voice grammar 140 to specific commands defined in a variable to command table 150. The variable to command table 150 further can include a binding of variable placeholders in the voice grammar 140 to specific preference parameters. In this way, the binding can be dynamic in nature between voice command and user interface navigation as the voice grammar 140 can be a VoiceXML compliant grammar configured for C3N and defined in markup which can be produced for binding at runtime.

Hence, as an example, the browser can generate the following C3N compliant VoiceXML link grammar for the settings in the user preference window:

```
<vxml:link eventexpr="application.lastresult$.interpretation.c3n">
    <grammar>
        <![CDATA[
            #JSGF V1.0;
            grammar user_preference;
            public <user_preference> = <show_preference> {$ = $show_preference}
            | <set_preference> {$ = $set_preference};
            <show_preference> = Browser show preference
            ( general {$.c3n = %general%;} | voice {$.c3n = %voice%;});
            <set_preference> = Browser set preference
            ( start page URL current page {$.c3n = %currentpage%;}
            | listening mode <listening_mode_setting> {$ = $listening_mode_setting});
            <listening_mode_setting> = ( push to talk {$.c3n = %PTT%;}
            | push to activate {$.c3n = %PTA%;}
            | automatic push to activate {$.c3n = %APTA%;});
        ]]>
    </grammar>
</vxml:link>
```

The foregoing <link> fragment within the Voice XML grammar can be a resource that can be localized for the language supported by the end user device. Moreover, the foregoing <link> fragment can include variable placeholders which can be resolved at runtime using the following table:

| Variable Name | Event String |
|---|---|
| %general% | "command.showpreference.general" |
| %voice% | "command.showpreference.voice" |
| %currentpage% | "command.setpreference.startpageurl.www.google.com" |
| %PTT% | "command.setpreference.listeningmode.PTT" |
| %PTA% | "command.setpreference.listeningmode.PTA" |
| %APTA% | "command.setpreference.listeningmode.APTA" |

The table can associate each variable with an event string which corresponds to a function in the multimodal content browser. By substituting the event string into the link grammar and then enabling the grammar, speech recognition events become bound to browser functions at runtime. Moreover, if the underlying speech engine is configured to support multiple languages, the table can be extended to support switching between languages.

For example, the exemplary grammar can match the phrase "Browser show preference voice" to the specified <link> event expression which can cause a VoiceXML event to be propagated with the string value "command.showpreference.voice". The multimodal browser can respond to the event by interpreting the event to be a "show preference" event with the parameter for the show preference event as voice. The parameter specifically can refer to the portion of the user preference interface as the page known as "voice". The logic assigned to the event then can display the voice page in the user preference interface to the multimodal content browser.

As another example, the exemplary grammar can match the phrase "Browser set preference listening mode push to talk", to the specified <link> event expression which can cause a VoiceXML event to be propagated with the string value "command.setpreference.listeningmode.PTT". The multimodal browser can respond to the event by interpreting the event to be a "set preference" event with the parameters for the "set preference" event as "listening mode" and "push to talk". The logic assigned to the event then can display the corresponding preference page, in this case the voice preference page if it is not currently on focus, and subsequently can set the "listening mode" setting in the page to "push to talk".

Figure 2:
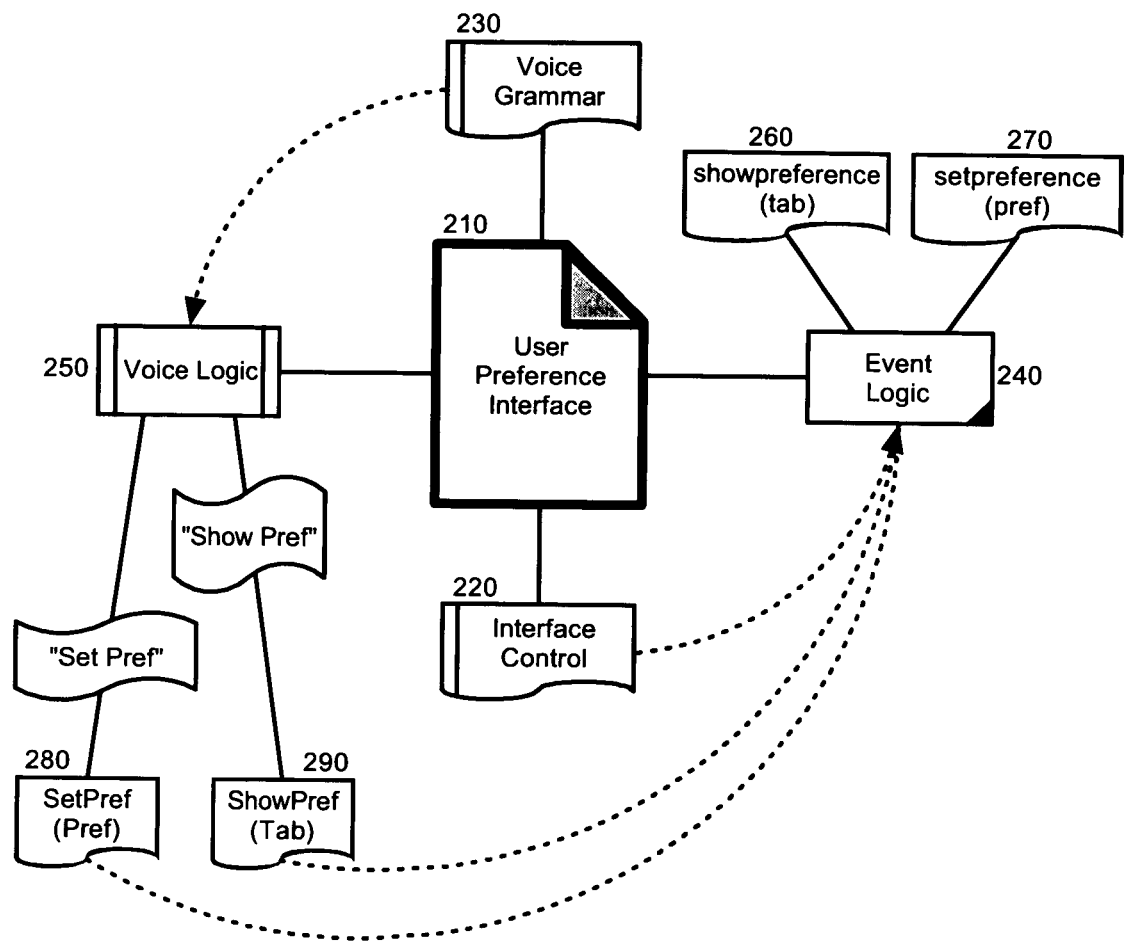
FIG. 2 is a schematic illustration of a system for enabling voice navigation of a user preference interface to a multimodal browser; and, FIG. 3 is a flow chart illustrating a process for enabling voice navigation of the user preference interface of FIG. 2.

To enable the voice navigation of the multimodal content browser, a system can be arranged as shown in FIG. 2. Specifically, FIG. 2 is a schematic illustration of a system for enabling voice navigation in a multimodal user preference interface. The system can include a user preference interface 210 to a multimodal content browser which can include one or more discrete groupings of user preference interface elements for setting user preferences for the browser. The user preference interface 210 can include associated interface controls 220 configured to invoke event logic 240 in response to the keyboard and mouse interactions of an end user with the elements of the user preference interface 210.

Notably, the user preference interface 210 can be voice enabled for navigation by way of the voice grammar 230. The voice grammar 230 can be a markup language specified grammar such as that which conforms with the VoiceXML specification. The voice grammar 230 further can include bindings between spoken words and phrases and specified commands 280, 290. Voice logic 250 can match spoken words and phrases to the specified commands 280, 290 such that the utterance of the words and phrases can result in the invocation of the event logic 240 just as if the event had been triggered through the comparable keyboard and mouse interactions of an end user.

For instance, the utterance "Browser Show Preference Voice" can be matched by the voice logic 250 in the voice grammar 230 to the binding "command.showpreference.voice". A resulting show preference event having a "voice" parameter can be posted to the event logic 240. The event logic 240 in turn can invoke the show preference logic 260 with the "voice" parameter to bring into focus the voice grouping of elements in the user preference interface 210. Similarly, the utterance "Browser Set Preference Listening Mode Push-to-Talk" can be matched by the voice logic 250 in the voice grammar 230 to the binding "command.setpreference.listeningmode.PTT". A resulting set preference event having "listeningmode" and "PTT" parameters can be posted to the event logic 240. The event logic 240 in turn can invoke the set preference logic 270 with the "listeningmode" and "PTT" parameters to bring into focus the voice grouping of elements in the user preference interface 210 and to apply the PTT setting to the listening mode element of the grouping in the user preference interface 210.

Figure 3:
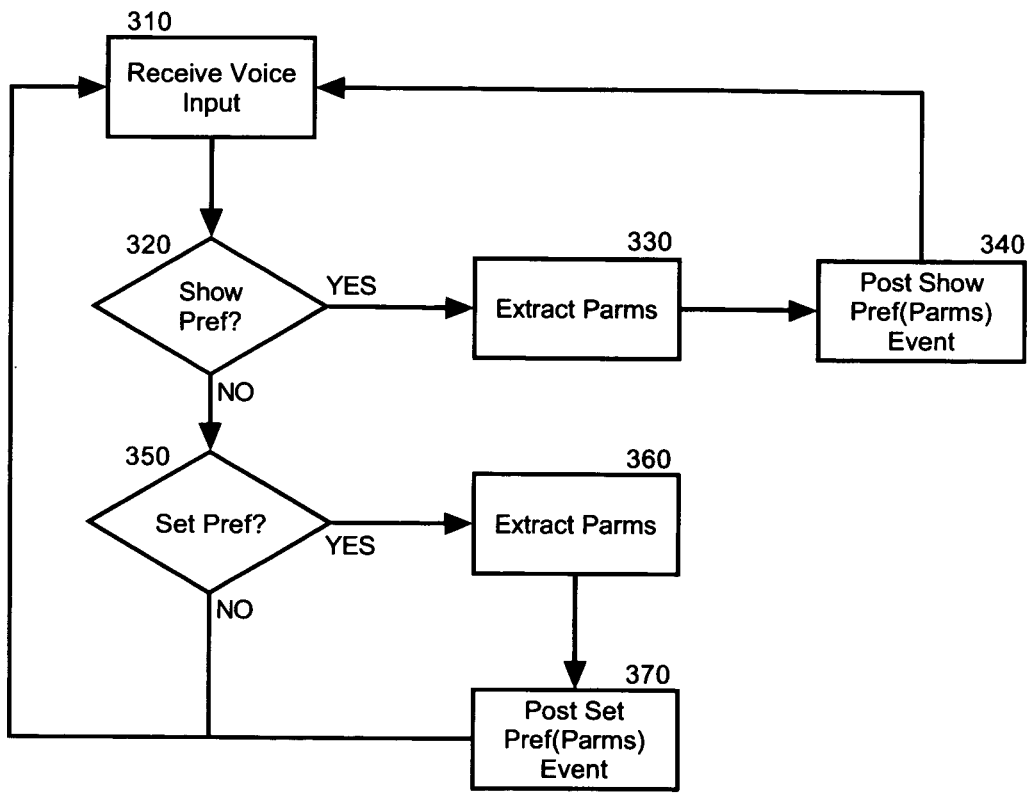

In more particular illustration, FIG. 3 is a flow chart illustrating a process for enabling voice navigation in the multimodal user preference interface of FIG. 2. Beginning in block 310, voice input can be received and the voice interpreter can apply a loaded speech grammar to the voice input. Subsequently, in decision block 320, if the voice input can be matched to a show preference entry in the grammar, in block 330 the parameters associated with the voice input and variably specified by the speech grammar can be extracted from a corresponding table variable to command table. Consequently, in block 340, a show preference event with the extracted parameters can be posted to the event handler for the user preference interface.

In decision block 320, if the voice input is determined not to match a show preference entry, in decision block 350, if the voice input can be matched to a set preference entry in the grammar, in block 360 the parameters associated with the voice input and variably specified by the speech grammar can be extracted from a corresponding table variable to command table. Consequently, in block 370, a set preference event with the extracted parameters can be posted to the event handler for the user preference interface.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for voice enabling a user interface in a multimodal content browser, the method comprising acts of:

accessing a first speech grammar, the first speech grammar having stored therein at least one voice command, the first speech grammar further storing a mapping of the at least one voice command to a corresponding placeholder identifier;

prior to performing a voice recognition processing, obtaining a second speech grammar from the first speech grammar, the second speech grammar storing a mapping of the at least one voice command to a navigation action that can be triggered by a user through the user interface, wherein the act of obtaining the second speech grammar comprises substituting a string of characters indicative of the navigation action in place of the placeholder identifier in the first speech grammar to obtain the second speech grammar, the string of characters being different from the placeholder identifier;

using the second speech grammar to perform the voice recognition processing, wherein the voice recognition processing comprises recognizing, from received voice input, the at least one voice command in the second speech grammar;

identifying the navigation action specified by the second speech grammar as corresponding to the at least one voice command; and invoking logic in the user interface consistent with the navigation action.

2. The method of claim 1, wherein said act of recognizing further comprises acts of:

comparing the voice input to entries in the second speech grammar, wherein the second speech grammar is a markup language specified speech grammar; and locating said at least one voice command in said specified speech grammar based upon said comparison.

3. The method of claim 2, wherein the placeholder identifier specified by the first speech grammar as corresponding to the at least one voice command is a variable, and wherein the act of obtaining the second speech grammar further comprises acts of:

looking up said variable in a table;

retrieving a parameter corresponding to said variable from said table; and identifying the string of characters based at least in part on the retrieved parameter.

4. The method of claim 1, wherein said act of invoking comprises acts of:

formulating an event utilizing said navigation action; and posting said event to an event handler in the user interface.

5. The method of claim 1, wherein said act of invoking comprises an act of invoking logic programmed to bring a specified grouping of elements in the user interface into focus.

6. The method of claim 1, wherein said act of invoking comprises an act of invoking logic programmed to set a preference in the user interface.

7. The method of claim 5, wherein said act of invoking comprises acts of:

first invoking logic programmed to bring a specified grouping of elements in the user interface into focus; and second invoking logic programmed to set a preference in said specified grouping.

8. The method of claim 1, wherein the string of characters indicative of the navigation action comprises an alphanumeric event string, and wherein the act of obtaining the second speech grammar further comprises:

identifying the alphanumeric event string based at least in part on the placeholder identifier, wherein substituting the string of characters comprises substituting the alphanumeric event string in place of the placeholder identifier in the first speech grammar.

9. The method of claim 1, wherein the placeholder identifier mapped by the first speech grammar to the at least one voice command is different from the at least one voice command.

10. A system for voice enabling a user interface in a multimodal content browser, the system comprising:

a first speech grammar having stored therein at least one voice command entry that stores a mapping of a voice command to a corresponding placeholder identifier; and at least one processor configured to:

obtain a second speech grammar from the first speech grammar, the second speech grammar storing a mapping of the at least one voice command to a navigation action that can be triggered by a user through the user interface, wherein obtaining the second speech grammar comprises substituting a string of characters indicative of the navigation action in place of the placeholder identifier in the first speech grammar to obtain the second speech grammar, the string of characters being different from the placeholder identifier;

use the second speech grammar to perform voice recognition processing, wherein the voice recognition processing comprises identifying, based on received voice input, the at least one voice command in at least one voice command entry in said second speech grammar;

identify the navigation action specified by the second speech grammar as corresponding to the at least one voice command; and invoke logic in the user interface consistent with the navigation action.

11. The system of claim 10, further comprising a table of command variables and corresponding command parameters, wherein the placeholder identifier specified by the first speech grammar as corresponding to the at least one voice command is a variable, and wherein said at least one processor is further configured to:

look up the variable in the table;

retrieve a parameter corresponding to the variable from the table; and identify the string of characters based at least in part on the retrieved parameter.

12. The system of claim 10, wherein the string of characters indicative of the navigation action comprises an alphanumeric event string, and wherein the at least one processor is programmed to obtain the second speech grammar at least in part by:

identifying the alphanumeric event string based at least in part on the placeholder identifier, wherein substituting the string of characters comprises substituting the alphanumeric event string in place of the placeholder identifier in the first speech grammar.

13. At least one non-transitory computer-readable medium having stored thereon computer instructions which, when executed, perform a method for voice enabling a user interface in a multimodal content browser, the method comprising acts of:

accessing a first speech grammar, the first speech grammar having stored therein at least one voice command, the first speech grammar furthering storing a mapping of the at least one voice command to a corresponding placeholder identifier;

prior to performing a voice recognition processing, obtaining a second speech grammar from the first speech grammar, the second speech grammar storing a mapping of the at least one voice command to a navigation action that can be triggered by a user through the user interface, wherein the act of obtaining the second speech grammar comprises substituting a string of characters indicative of the navigation action in place of the placeholder identifier in the first speech grammar to obtain the second speech grammar, the string of characters being different from the placeholder identifier;

using the second speech grammar to perform the voice recognition processing, wherein the voice recognition processing comprises recognizing, from received voice input, the at least one voice command in the second speech grammar;

identifying the navigation action specified by the second speech grammar as corresponding to the at least one voice command; and invoking logic in the user interface consistent with the navigation action.

14. The at least one non-transitory computer-readable medium of claim 13, wherein said act of recognizing further comprises acts of:

comparing the voice input to entries in the second speech grammar, wherein the second speech grammar is a markup language specified speech grammar; and locating said at least one voice command in said specified speech grammar based upon said comparison.

15. The at least one non-transitory computer-readable medium of claim 14, wherein the placeholder identifier specified by the first speech grammar as corresponding to the at least one voice command is a variable, and wherein the act of obtaining the second speech grammar further comprises acts of:

looking up said variable in a table;

retrieving a parameter corresponding to said variable from said table; and identifying the string of characters based at least in part on the retrieved parameter.

16. The at least one non-transitory computer-readable medium of claim 13, wherein said act of invoking comprises acts of:

formulating an event utilizing said navigation action; and posting said event to an event handler in the user interface.

17. The at least one non-transitory computer-readable medium of claim 13, wherein said act of invoking comprises an act of invoking logic programmed to bring a specified grouping of elements in the user interface into focus.

18. The at least one non-transitory computer-readable medium of claim 17, wherein said act of invoking comprises acts of:

first invoking logic programmed to bring a specified grouping of elements in the user interface into focus; and second invoking logic programmed to set a preference in said specified grouping.

19. The at least one non-transitory computer-readable medium of claim 13, wherein said act of invoking comprises an act of invoking logic programmed to set a preference in the user interface.

20. The at least one non-transitory computer-readable medium of claim 13, wherein the string of characters indicative of the navigation action comprises an alphanumeric event string, and wherein the act of obtaining the second speech grammar further comprises:

identifying the alphanumeric event string based at least in part on the placeholder identifier, wherein substituting the string of characters comprises substituting the alphanumeric event string in place of the placeholder identifier in the first speech grammar.

\* \* \* \* \*